United States Patent
Jorgovanovic et al.

(10) Patent No.: US 10,104,571 B1
(45) Date of Patent: *Oct. 16, 2018

(54) SYSTEM FOR DISTRIBUTING DATA USING A DESIGNATED DEVICE

(71) Applicant: AMAZON TECHNOLOGIES, INC., Seattle, WA (US)

(72) Inventors: Milos Jorgovanovic, Mountain View, CA (US); Jin Guo, Cupertino, CA (US)

(73) Assignee: AMAZON TECHNOLOGIES, INC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,450

(22) Filed: Jul. 17, 2017

Related U.S. Application Data

(63) Continuation of application No. 15/246,070, filed on Aug. 24, 2016, now Pat. No. 9,775,069.

(51) Int. Cl.
| | |
|---|---|
| *H04W 28/00* | (2009.01) |
| *H04R 3/00* | (2006.01) |
| *H04W 28/02* | (2009.01) |
| *H04L 12/26* | (2006.01) |
| *H04R 3/12* | (2006.01) |
| *H04W 72/04* | (2009.01) |

(52) U.S. Cl.
CPC ..... *H04W 28/0236* (2013.01); *H04L 43/0847* (2013.01); *H04R 3/12* (2013.01); *H04W 72/048* (2013.01)

(58) Field of Classification Search
CPC ............ H04W 28/0236; H04W 72/048; H04L 43/0847; H04R 3/12
See application file for complete search history.

(56) References Cited

U.S. PATENT DOCUMENTS

| | | | |
|---|---|---|---|
| 7,359,950 B2 * | 4/2008 | Choi | H04W 84/20 709/208 |
| 8,214,447 B2 | 7/2012 | Deslippe et al. | |
| 8,244,916 B1 | 8/2012 | Loc et al. | |
| 9,078,072 B2 * | 7/2015 | Sundaresan | H04R 29/00 |
| 9,331,799 B2 * | 5/2016 | Gao | H04L 65/4076 |
| 2005/0219268 A1 | 10/2005 | Kyle | |
| 2006/0149850 A1 | 7/2006 | Bowman | |

(Continued)

OTHER PUBLICATIONS

Bernardi, Brenda C., "Notice of Allowance dated Dec. 28, 2017", U.S. Appl. No. 15/421,014, The United States Patent and Trademark Office, dated Dec. 28, 2017.

(Continued)

*Primary Examiner* — Brenda C Bernardi
(74) *Attorney, Agent, or Firm* — Lindauer Law, PLLC

(57) ABSTRACT

Described are techniques for configuring a group of devices to perform a function by using a master device to provide data to other devices within the group. Test data may be communicated between a selected device and each device in the group to determine link quality values for each communication. A value indicative of the airtime that would be used to distribute data using the selected device may be determined. This process may be repeated for each device within the group. The selected device associated with the lowest airtime value may be designated as the master device. Data transmitted from the master device to the other devices may be used to cause the group of devices to perform a function.

20 Claims, 6 Drawing Sheets

(56) References Cited

U.S. PATENT DOCUMENTS

| | | | |
|---|---|---|---|
| 2009/0124233 A1 | 5/2009 | Morris | |
| 2009/0147746 A1 | 6/2009 | Alay et al. | |
| 2009/0190581 A1 | 7/2009 | Chang et al. | |
| 2012/0237054 A1* | 9/2012 | Eo | H04R 5/04 |
| | | | 381/80 |
| 2012/0271902 A1* | 10/2012 | Baliga | H04L 43/0811 |
| | | | 709/209 |
| 2012/0303705 A1 | 11/2012 | Park et al. | |
| 2016/0350067 A1* | 12/2016 | Sundaresan | G06F 3/165 |
| 2017/0019197 A1* | 1/2017 | Rajapakse | H04H 20/18 |
| 2017/0055020 A1* | 2/2017 | Shaw | H04N 21/4126 |
| 2017/0098466 A1* | 4/2017 | Elliot | G11B 27/10 |

OTHER PUBLICATIONS

Bernardi, Brenda C., "Notice of Allowance dated May 25, 2017", U.S. Appl. No. 15/246,070, The United States Patent and Trademark Office, dated May 25, 2017.

D'Agosta, Stephen M., "Non-Final Office Action dated Feb. 16, 2018", U.S. Appl. No. 15/245,897, The United States Patent and Trademark Office, dated Feb. 16, 2018.

Kuo, et al., "Multicast Routing Scheme for Recipient Maximization in Wireless Relay Networks", IEEE Transactions on Vehicular Technology, vol. 59, No. 8, Oct. 2010, dated Oct. 8, 2010.

Saunders, Jr., Joseph, "Non-final Office Action dated Mar. 9, 2018", U.S. Appl. No. 15/373,677, The United States Patent and Trademark Office, dated Mar. 9, 2018.

\* cited by examiner

SYSTEM FOR DISTRIBUTING DATA USING A DESIGNATED DEVICE

PRIORITY

This application is a continuation of, and claims priority to, pending U.S. patent application Ser. No. 15/246,070, filed on Aug. 24, 2016, entitled "System for Configuring Distributed Audio Output Using a Designated Audio Device". Application Ser. No. 15/246,070 is incorporated by reference herein in its entirety.

BACKGROUND

When configuring a group of networked audio devices to provide a synchronized audio output, the devices used and the manner in which the audio data is distributed may be constrained by characteristics of the audio devices or network.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
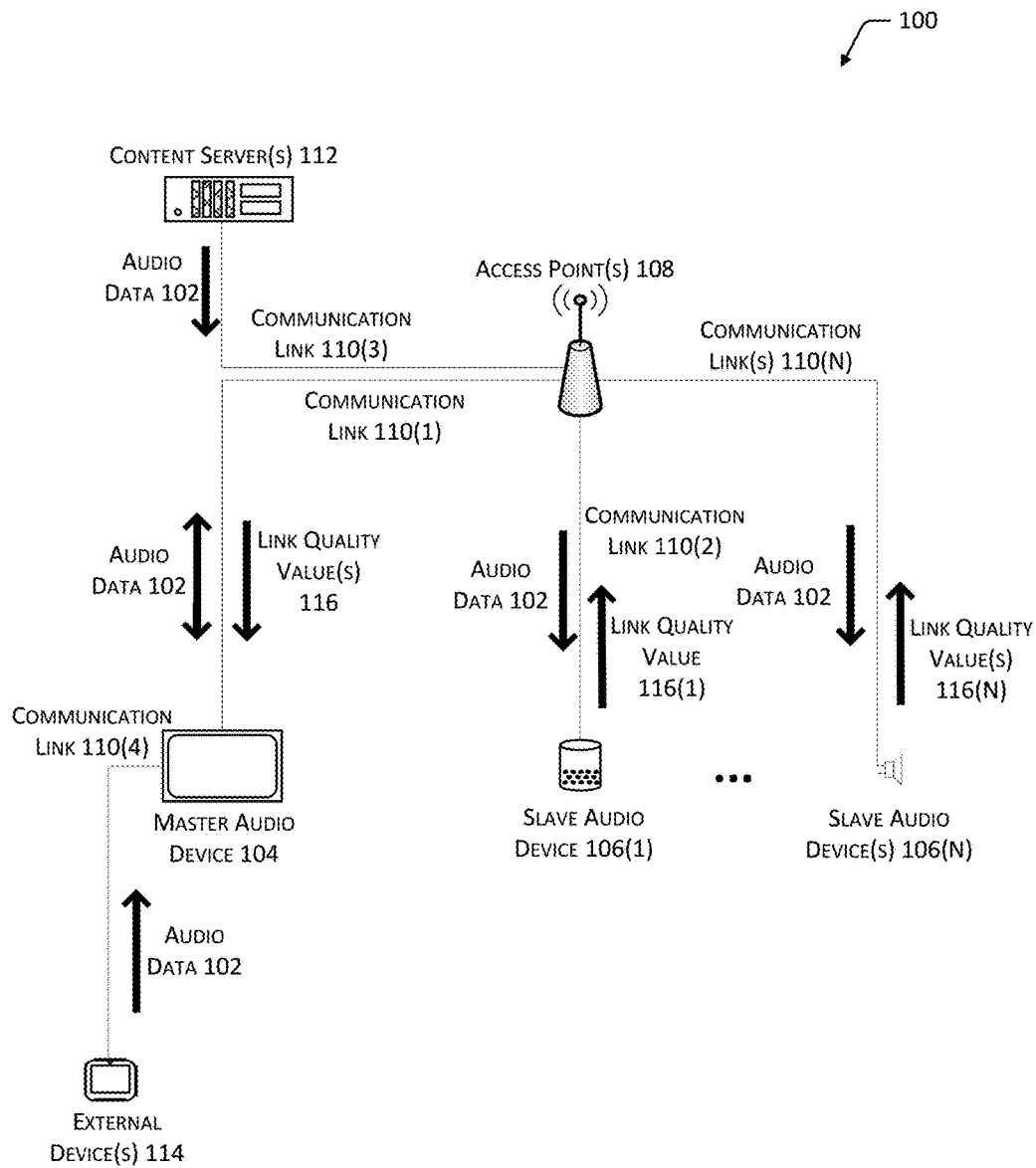
FIG. 1 depicts an implementation of a system for distributing audio data to multiple audio devices in communication with an access point.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Audio systems may include multiple audio devices, in communication with one another via one or more networks, to provide a synchronized audio output to users within an environment. In some cases, a user may select a particular group of audio devices to be used, such as a set of audio devices within a particular room of a home, or all of the audio devices located on a particular floor of the home. The user may also select a particular audio application or audio content for output. Based on the location and other characteristics of each audio device, the timing and volume of the audio output for each audio device may be configured. For example, a time delay between various audio streams provided to different devices may be used to synchronize the audio output. As another example, different devices may be used to provide audio output at different volumes based on distance from a listening position, different channels of a surround-sound output, and so forth.

However, the quality of the audio output provided using a group of networked audio devices may be limited based on the characteristics of the audio devices and of the network. For example, multiple audio devices, access points, and other devices may communicate using a Wi-Fi® protocol that corresponds at least in part to section 802.11 of the specifications set forth by the Institute of Electrical and Electronics Engineers (IEEE). The frequency bands, number of channels, and other characteristics of the network may determine an airtime capacity for one or more channels of the network. Each device accessing the network may utilize a portion of the total Wi-Fi® airtime able to be supported by the network. Airtime may include the time used by a device to transmit and receive data, which may be measured in frames or units of time. The airtime used by a device may be affected by the characteristics of the device, the characteristics of the access point, the distance between the device and a wireless access point, the presence objects between the device and the access point, and so forth. For example, a device may transmit and receive data at a particular rate, which may be expressed as a data throughput value measured in units of data per units of time. A first device having a low data throughput value would use a greater quantity of airtime to transmit and receive data than a second device having a greater data throughput value. The airtime available for use by a group of audio devices may vary based on the current level of use (e.g., congestion) of a network. If the airtime used by a group of audio devices exceeds the available airtime of a network, attempts to provide an audio output using the group of audio devices may fail, or irregularities in the audio output, such as audio stuttering, may be observed.

While the airtime used by a group of audio devices can be reduced by removing one or more devices from the group, in some cases, modifying the manner in which audio data is distributed to the audio devices may reduce the airtime associated with providing the audio output. For example, audio data is typically distributed to a group of audio devices using a master audio device, which receives audio data from an external source then provides the audio data to other networked audio devices, referred to as slave audio devices. The particular audio device that is selected for use as the master audio device and the manner in which the master audio device transmits audio data to slave audio devices may affect the total amount of airtime used by the group of audio devices.

Described in this disclosure are techniques for determining a particular audio device, from within a group of audio devices, that will minimize the airtime used to provide an audio output. This particular audio device may be designated as the master audio device for the group of audio devices. After a master audio device has been determined, the airtime used by the group of audio devices may be determined based on data throughput values calculated for each audio device. In other implementations, other values indicative of the quality of a communication link between audio devices and access points, or between audio devices and other audio devices may be used in place of or in addition to data throughput values. For example, a received signal strength indication (RSSI), a signal-to-noise ratio (SNR), a modulation and coding scheme (MCS) value, a retransmission rate, or a count of data streams transmittable by a device may also be used as an indication of the quality of a communication link. If the determined airtime for the group of audio devices is less than a threshold, audio data may be provided from the master audio device to the group of audio devices for output. If the airtime exceeds the threshold, a notification may be generated indicating that the group of audio devices may not be used, or that use of the selected group of audio devices may result in errors, such as audio stuttering.

In one implementation, a group of audio devices may distribute audio data using a wireless access point. For example, audio data from a master audio device may be provided to other audio devices via communication links between the audio devices and the access point. The group of audio devices may be determined based on user input, preexisting default device group data, or automatically based on data throughput or other values determined for the audio devices. Device data associated with a group of audio devices may indicate data throughput values for communication between each of the audio devices and the access point. The data throughput values for each device may correspond to the rate at which data is successfully transmitted between one or more wireless access points and the audio device, such as a quantity of bits per unit time. In some implementations, the data throughput value for each audio device may be determined based on the physical data rate and packet error rate associated with the audio device. For example, an audio device that communicates using a Wi-Fi® protocol may be configured to calculate an average physical data rate, determined based in part on an associated MCS of the audio device. Continuing the example, the average physical data rate (AVGPHY) may include a moving average, determined using a quantity of historical values (L) for the physical data rate (PHY). In some cases, each value for the physical data rate may be weighted using a weighting coefficient (W), as indicated in Equation 1 below:

$$AVGPHY = W_0 * PHY_N + W_1 * PHY_{N-1} + \ldots + W_L * PHY_{N-L} \quad \text{(Equation 1)}$$

In some implementations, the equation used to determine the average physical data rate for an audio device may include other factors, such as congestion associated with communication using the audio device, one or more constants, and so forth. The average physical data rate and the packet error rate (PER) for a particular audio device may be used to calculate the data throughput (THR), which in some implementations may include a Transmission Control Protocol (TCP) throughput, associated with communication between the audio device and an access point. The average physical data rate may be multiplied by a scaling factor (K), which may be determined based on one or more of the MCS or physical data rate of the audio device, as indicated in Equation 2 below. For example, scaling factors may be determined using a look-up table or other data structure that associates scaling factor values with ranges of physical data rates.

$$THR = (K * AVGPHY) * [AVGPHY/(1+PER)] \quad \text{(Equation 2)}$$

In other implementations, the equation used to determine the data throughput value for an audio device may include other factors, such as congestion associated with communication using the audio device, one or more constants, and so forth. In some implementations, the data throughput value for each audio device may be determined by the audio device, itself. For example, an audio device may be configured to monitor a connection between the audio device and an access point to determine the physical data rate of the connection. The audio device may also be configured, such as by using an audio device driver, to monitor a packet error rate associated with communications between the audio device and the access point. Computer-executable instructions stored in association with the audio device may be used to calculate the data throughput value based on the physical data rate and the packet error rate. In other implementations, the data throughput value may be determined by one or more other computing devices. For example, a server, the master audio device, or another computing device may determine the physical data rate or packet error rate associated with an audio device, and calculate the data throughput value. As another example, an audio device may determine a physical data rate and packet error rate, while a separate computing device may determine the data throughput value based on the physical data rate and packet error rate.

The audio device associated with the greatest data throughput value may be selected for use as the master audio device. Because each transmission of audio data may utilize the link between the master audio device and the access point, selection of a master audio device having the greatest data throughput for communication with the access point may reduce the airtime used by the group of audio devices. After the master audio device has been determined, a value indicative of the airtime used to distribute the audio data to the audio devices may be determined. The airtime (AT) used may depend on the number of audio devices (N) within the group, the data throughput value for the master audio device (THM), the data throughput values for the slave audio devices (TH1, TH2 . . . THN), and the audio throughput associated with an application or audio content (THA) to be output, as indicated in Equation 3 below:

$$AT = [N-1*(THA/THM)] + (THA/TH1) + \ldots + (THA/THN) \quad \text{(Equation 3)}$$

In some implementations, calculation of the airtime value may also be determined based on the packet error rates of one or more audio devices, a congestion value associated with communication using the audio device(s), one or more constants, and so forth. If the airtime associated with the group of audio devices is less than a threshold airtime value, audio data may be provided from the master audio device to the other audio devices via the access point. If the airtime exceeds the threshold airtime value, a notification may be generated indicating the relationship between the airtime for the audio devices and the threshold airtime value. For example, a notification may indicate that it is not possible to provide a particular audio output using a selected group of audio devices, or that attempting to provide the audio output using the selected group may result in errors or irregularities, such as audio stuttering.

In some implementations, the master audio device or another computing device in communication therewith may determine a congestion value associated with use of the network. For example, access data, such as a clear channel access register, may be used to determine a count of unsuccessful attempts to communicate data by one or more of the audio devices, as well as a total count of attempts to communicate data. The ratio of the count of unsuccessful attempts to the total count of attempts may indicate a level of congestion associated with the network. The congestion value may be used to affect the calculated airtime value or the threshold value to which the airtime value is compared. For example, if the sum of the airtime value and the congestion value exceeds the threshold airtime value, a notification may be generated indicating that it is not possible to provide a particular audio output using the selected group of audio devices without experiencing errors or irregularities.

In some implementations, the master audio device may receive audio data from another computing device in the environment, such as via a Bluetooth® communication link. In such cases, the utilization of the wireless radio of the master audio device may limit the devices that may be present in the group of audio devices that receives audio data from the master audio device. Based on the number of audio devices (N) within the group of audio devices, an airtime value (ATR) associated with the airtime used by the master audio device to receive the audio data from another device (e.g., a source of the audio data), the congestion value (C), the audio throughput (THA) associated with the application or audio content, and the data throughput (THM) of the master audio device, a value indicative of the radio utilization (RU) of the master audio device may be determined, as illustrated in Equation 4:

$$RU=ATR+[(N-1)*(THA/THM)*(1-C)] \qquad \text{(Equation 4)}$$

The radio utilization value may indicate the amount of airtime or other resources used by the wireless radio of the master audio device. The radio utilization of the master audio device may differ from the Wi-Fi® airtime used to distribute the audio data if, for example, the master audio device receives the audio data via a Bluetooth® connection or another protocol unrelated to the communication channel used to communicate with the slave audio devices. If the radio utilization value exceeds a threshold utilization value, a notification may be generated indicating that the group of audio devices may not be used to provide an audio output, or that use of the group of audio devices may include a reduced quality output or irregularities, such as audio stuttering.

In another implementation, a master audio device may be used to provide audio data directly to other audio devices, such as by using a multicast transmission to send audio data to a group of audio devices in a single transmission. To determine an audio device within the group of audio devices to designate as the master audio device, test data may be transmitted between audio devices to determine data throughput values associated with communication between different audio devices. For example, a first audio device may provide test data, such as probe request packets, to each other audio device within the group. The first audio device may receive responses, such as probe response packets, from the other audio devices. The transmission of the test data may be used to determine a set of data throughput values associated with communication between the first audio device and each of the other audio devices. In other implementations, other indications of the strength or quality of the communications, such as RSSI, SNR, MCS values, retransmission rates, or numbers of data streams may be determined in addition to or in place of the data throughput values. The first audio device may also determine a data throughput value (TH1) associated with communication between the first audio device and the access point. The greatest data throughput value (THMax) between the first audio device and one of the other audio devices may be used to determine a value indicative of the airtime (AT) that would be used to distribute audio data using the first audio device as a master audio device, as indicated in Equation 5 below:

$$AT=[(1/THMax)+(1/TH1)] \qquad \text{(Equation 5)}$$

In some implementations, the value indicative of the airtime used by a potential master audio device may also be affected by the packet error rates of one or more audio devices, a congestion value associated with use of the audio device(s), one or more constants, and so forth. This process may be repeated for each audio device within the group of audio devices. The audio device associated with the lowest airtime value may be designated as the master audio device. Because each transmission of audio data may utilize the links between the master audio device and the other audio devices, selection of a master audio device that uses the least amount of airtime to transmit audio data to the other audio devices may reduce the total airtime used by the group of audio devices.

After the master audio device has been determined, a maximum airtime value (ATMax) associated with distribution of audio data from the master audio device to the other audio devices may be determined. The maximum airtime value may be determined based on the data throughput associated with the audio application or content (THA), the data throughput values (THR) associated with the slave audio devices, the packet error rates (PER) associated with the slave audio devices, the data throughput value (TH1) between the master audio device and the access point, and the packet error rate (PER1) associated with the master audio device, as indicated in Equation 6 below:

$$ATMax=\max\{(THA/THR)*(1+PER)\}+(THA/TH1)*(1+PER1) \qquad \text{(Equation 6)}$$

In Equation 6, above, the quantity [(THA/THR)*(1+PER)] may be determined for each audio device, based on the data throughput value and packet error rate for the particular audio device. The quantity max{(THA/THR)*(1+PER)} may include the maximum value determined for one of the audio devices. In some cases, the maximum airtime value may also be affected by a congestion value associated with use of one or more of the audio devices, one or more constants, and so forth.

If the maximum airtime value associated with the group of audio devices is less than a threshold airtime value, audio data may be provided from the master audio device to the other audio devices. If the maximum airtime value exceeds the threshold airtime value, a notification may be generated indicating the relationship between the airtime for the audio devices and the threshold airtime value. For example, a notification may indicate that it is not possible to provide a particular audio output using a selected group of audio devices, or that attempting to provide the audio output using the selected group may result in errors or irregularities, such as audio stuttering.

In some implementations, test data may be transmitted using only a subset of the audio devices, while other audio devices may be determined as unsuitable for use as the master audio device without use of test data. For example, a data throughput value associated with communication between each audio device and an access point may be determined. For audio devices having a data throughput value that exceeds a threshold value, test data may be transmitted and the data throughput values for communication with other audio devices may be determined. Audio devices having a data throughput value that does not meet the threshold value may be excluded from use as a master audio device. As another example, one or more audio devices may be excluded from use as a master audio device based on the location of the audio device(s) or the ability of the audio device(s) to detect and communicate data with other audio devices. Continuing the example, if a particular audio device is positioned near an extremity of a structure and the particular audio device is unable to exchange data with another audio device positioned at an opposite extremity of the structure, the particular audio device may be excluded from use as a master audio device. In other implementations, the location of one or more audio devices may be determined, and audio devices that are not within a threshold distance of each other audio device may be excluded from use as a master audio device.

In some implementations, the master audio device or another computing device in communication therewith may determine a congestion value, which in some cases may include a ratio of the count of unsuccessful attempts to communicate using the network to a total count of attempts. The congestion value may be used to affect the calculated maximum airtime value or the threshold airtime value. For example, if the sum of the maximum airtime value and the congestion value exceeds the threshold airtime value, a notification may be generated indicating that it is not possible to provide a particular audio output using the selected group of audio devices or that attempting to use the selected group of audio devices may reduce the quality of the audio output.

In some implementations, a radio utilization value corresponding to use of the wireless radio of the master audio device may be determined, such as by using Equation 7, below.

$$RU = ATR + \max\{(THA/THR)*(1+PER)\}*(1-C) \quad \text{(Equation 7)}$$

In Equation 7, the quantity $(THA/THR)*(1+PER)$ may be determined for each slave audio device, and the quantity $\max\{(THA/THR)*(1+PER)\}$ may include the largest value for this quantity determined with regard to a particular slave audio device. If the radio utilization value exceeds a threshold utilization value, a notification may be generated indicating the relationship between the utilization value and the threshold utilization value.

FIG. 1 depicts an implementation of a system 100 for distributing audio data 102 to multiple audio devices. The audio data 102 may be used to provide an audio output using the audio devices. The audio output may include, for example, a synchronized output in which multiple audio devices emit sound. In the example system 100, FIG. 1 depicts a master audio device 104, a first slave audio device 106(1), and one or more additional slave audio devices 106(N). While FIG. 1 depicts the master audio device 104 as a smart television that may include one or more speakers, and the slave audio devices 106 as freestanding speaker devices, the audio devices may include any type of device that is capable of receiving audio data via a network and generating audio output based on the audio data 102. For example, the master audio device 104 and slave audio devices 106 may communicate with one or more wireless access points 108 using a Wi-Fi® network. In other implementations, the audio devices may communicate using other types of networks or protocols, such as Bluetooth®, Zig-Bee®, Z-Wave®, Ethernet, 3G, 4G, LTE, and so forth. While FIG. 1 depicts a single access point 108, in other implementations, the audio devices may communicate with multiple access points 108, and the access points 108 may communicate with one another via an Ethernet connection or another type of direct or wireless method of data communication.

FIG. 1 depicts a first communication link 110(1) between the master audio device 104 and the access point(s) 108, a second communication link 110(2) between the first slave audio device 106(1) and the access point(s) 108, and one or more additional communication links 110(N) between the additional slave audio device(s) 106(N) and the access point(s) 108. Audio data 102 received by the master audio device 104 may be distributed to the slave audio devices 106 via the communication links 110. For example, FIG. 1 illustrates a third communication link 110(3) between one or more content servers 112 and the access point(s) 108 that may be used to provide audio data 102 from the content server(s) 112 to the master audio device 104 via the third communication link 110(3) and first communication link 110(1).

In other embodiments, the master audio device 104 may receive audio data 102 from one or more external devices 114, such as a computing device in communication with the master audio device 104 via a Bluetooth® connection or another type of protocol. For example, FIG. 1 depicts an example external device 114 as a tablet computer, which may provide audio data 102 to the master audio device 104 via a fourth communication link 110(4), which may, in some implementations, include a Bluetooth® connection.

The master audio device 104 may provide audio data 102 received from one or more of the content server(s) 112 or external device(s) 114 to the slave audio devices 106 by transmitting the audio data 102 to the access point(s) 108 via the first communication link 110(1). The first slave audio device 106(1) may then receive the audio data 102 via the second communication link 110(2). Each additional slave audio device 106(N) may receive the audio data 102 via an additional communication link 110(N).

In some implementations, the slave audio devices 106, or another computing device in communication therewith, may be configured to determine link quality values 116 associated with the quality of the communication links 110 between the slave audio devices 106 and the access point(s) 108. For example, the first slave audio device 106(1) may determine a first link quality value 116(1), and one or more additional slave audio devices 106(N) may determine additional link quality values 116(N). The link quality values 116 may include, for example, data throughput values associated with the rate of communication using the communication links 110. In other implementations, the link quality values 116 may include RSSI values, SNR values, MCS values, retransmission rates, or an indication of a number of data streams able to be processed by a slave audio device 106. The master audio device 104 may also determine a link quality value 116 associated with communication between the master audio device 104 and the access point(s) 108. The link quality values 116 may be used to determine which of the audio devices is designated as the master audio device 104. For example, a master audio device 104 associated with the greatest data throughput value may be designated to minimize the airtime used to transmit audio data 102 to the slave audio devices 106 using the master audio device 104. Continuing the example, because the first communication link 110(1) between the master audio device 104 and the access point(s) 108 would be used for each communication of audio data 102, use of the audio device having the greatest data throughput as the master audio device 104 would minimize the airtime used to distribute the audio data 102 to the audio devices. The link quality values 116 may also be used to determine the airtime that would be used to distribute the audio data 102 from the master audio device 104 to the slave audio devices 106 via the communication links 110 with the access point(s) 108.

Figure 2:
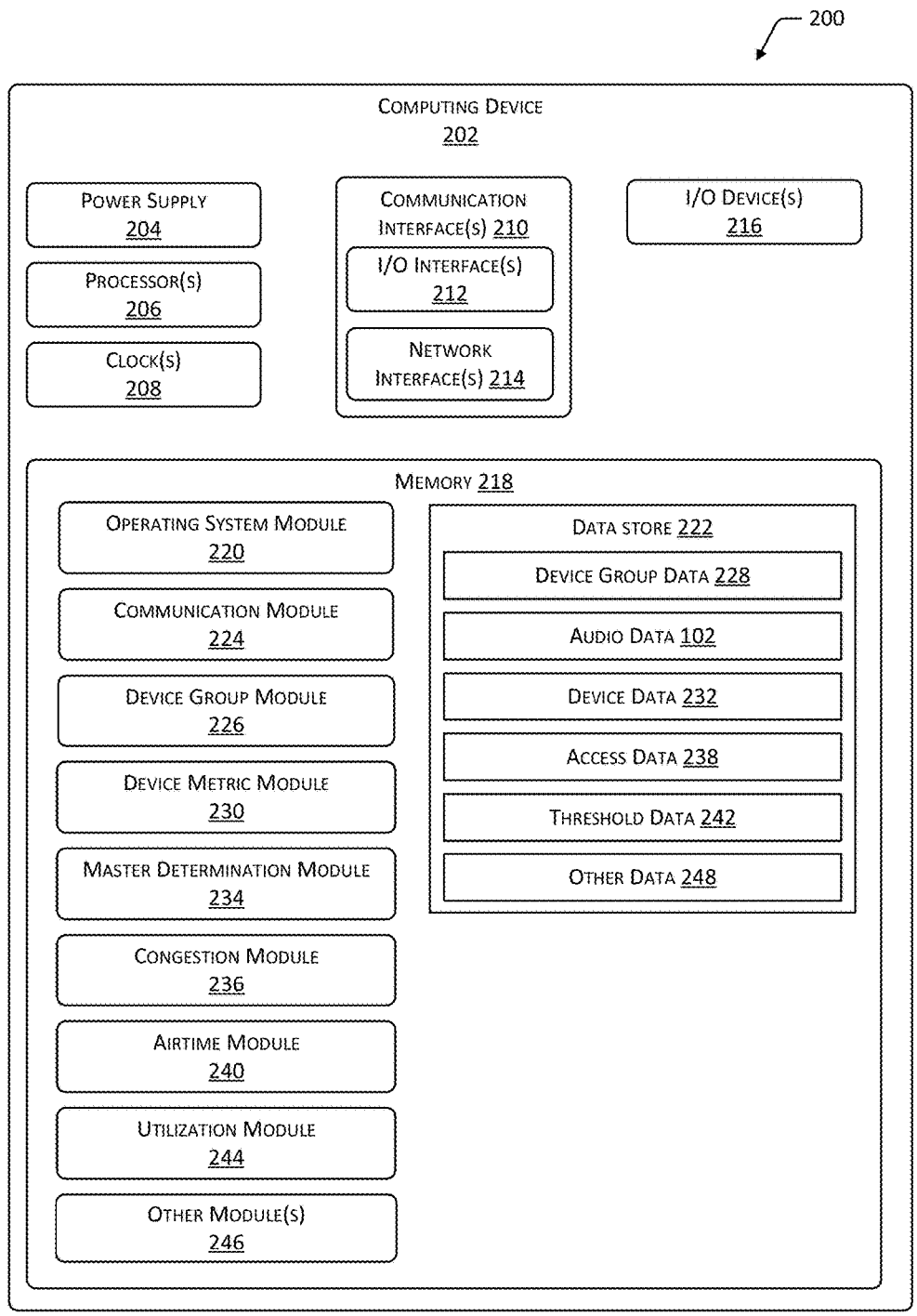
FIG. 2 is a block diagram depicting one implementation of a computing device within the scope of the present disclosure.

FIG. 2 is a block diagram 200 depicting one implementation of a computing device 202 within the scope of the present disclosure. The computing device 202 may include, without limitation, any of the devices depicted in FIG. 1, such as a master audio device 104, a slave audio device 106, or another computing device 202 in communication with one or more audio devices, such as an external device 114 or content server 112. In other implementations, the computing device 202 may include a separate computing device 202, not depicted in FIG. 1, that is in communication with the access point 108 or one or more of the audio devices. Additionally, while FIG. 2 depicts a single block diagram 200, the computing device 202 may include multiple computing devices 202 that collaborate to perform the functions described herein. For example, multiple audio devices or other computing devices 202 in communication therewith may perform the functions of the depicted computing device 202.

The computing device 202 may include one or more power supplies 204 configured to provide electrical power suitable for operating the components of the computing device 202. In some implementations, the power supply 204 may include a rechargeable battery, fuel cell, photovoltaic cell, power conditioning circuitry, and so forth.

The computing device 202 may include one or more hardware processor(s) 206 (processors) configured to execute one or more stored instructions. The processor(s) 206 may include one or more cores. One or more clocks 208 may provide information indicative of date, time, ticks, and so forth. For example, the processor(s) 206 may use data from the clock 208 to generate a timestamp, trigger a preprogrammed action, and so forth.

The computing device 202 may include one or more communication interfaces 210, such as input/output (I/O) interfaces 212, network interfaces 214, and so forth. The communication interfaces 210 may enable the computing device 202, or components of the computing device 202, to communicate with audio devices and other computing devices 202 or components thereof. The I/O interfaces 212 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 212 may couple to one or more I/O devices 216. The I/O devices 216 may include any manner of input device or output device associated with the computing device 202 or with another computing device 202 in communication therewith. For example, I/O devices 216 may include touch sensors, keyboards, mouse devices, microphones, image sensors (e.g., cameras), scanners, displays, speakers, haptic devices, printers, motion sensors, location sensors, and so forth. In some implementations, the I/O devices 216 may be physically incorporated with a computing device 202 or may be externally placed.

The network interfaces 214 may be configured to provide communications between the computing device 202 and other devices, such as the I/O devices 216, routers, access points 108, and so forth. The network interfaces 214 may include devices configured to couple to one or more networks including local area networks (LANs), wireless LANs, wide area networks (WANs), wireless WANs, and so forth. For example, the network interfaces 214 may include computing devices 202 compatible with Ethernet, Wi-Fi®, Wi-Fi Direct®, Bluetooth®, Bluetooth® Low Energy, ZigBee®, Z-Wave®, 3G, 4G, LTE, and so forth.

The computing device 202 may include one or more busses or other internal communications hardware or software that allows for the transfer of data between the various modules and components of the computing device 202.

As shown in FIG. 2, the computing device 202 may include one or more memories 218. The memory 218 may include one or more computer-readable storage media (CRSM). The CRSM may be any one or more of an electronic storage medium, a magnetic storage medium, an optical storage medium, a quantum storage medium, a mechanical computer storage medium, and so forth. The memory 218 may provide storage of computer-readable instructions, data structures, program modules, and other data for the operation of the computing device 202. A few example modules are shown stored in the memory 218, although the same functionality may alternatively be implemented in hardware, firmware, or as a system on a chip (SoC).

The memory 218 may include one or more operating system (OS) modules 220. The OS module 220 may be configured to manage hardware resource devices such as the I/O interfaces 212, the network interfaces 214, the I/O devices 216, and to provide various services to applications or modules executing on the processors 206. The OS module 220 may implement a variant of the FreeBSD™ operating system as promulgated by the FreeBSD® Project; UNIX® or a UNIX-like operating system; a variation of the Linux™ operating system as promulgated by Linus Torvalds; the Windows® operating system from Microsoft Corporation of Redmond, Wash., USA; or other operating systems.

A data store 222 and one or more of the following modules may also be stored in the memory 218. The modules may be executed as foreground applications, background tasks, daemons, and so forth. The data store 222 may use a flat file, database, linked list, tree, executable code, script, or other data structure to store information. In some implementations, the data store 222 or a portion of the data store 222 may be distributed across one or more other devices including other computing devices 202, network attached storage devices, and so forth.

A communication module 224 stored in the memory 218 may be configured to establish communications with audio devices, servers, external devices 114, or other computing devices 202.

The memory 218 may also store a device group module 226. The device group module 226 may access device group data 228 that indicates one or more audio devices to be used to provide an audio output. In some implementations, the device group module 226 may be configured to provide a user interface, receive user input indicative of one or more audio devices, and store the user input as device group data 228. For example, user input may be used to select particular audio devices for use providing an audio output. Continuing the example, a user may select a first group of audio devices located on the first floor of a dwelling to provide a first audio output, and a second group of audio devices located on the second floor of the dwelling to provide a different audio output. Device identifiers indicative of the audio devices selected for each group may be stored as device group data 228. In some implementations, the user interface may also receive user input indicative of the audio data 102 to be used to generate the audio output. For example, the audio data 102 may include one or more of an application or audio content that may be used to cause one or more audio devices to emit sound.

In other implementations, the device group data 228 may include preexisting, default data indicating one or more audio devices. In still other implementations, the device group module 226 may be configured to generate device group data 228 based on characteristics of the audio data 102 or one or more of the audio devices. For example, based on one or more rules or threshold values, the device group module 226 may determine audio devices having a data throughput or other indication of signal strength that exceeds a threshold, or audio devices having a packet error rate or predicted airtime use that is less than a threshold, and generate device group data 228 indicative of these audio devices.

The memory 218 may also store a device metric module 230. The device metric module 230 may access device data 232 indicative of one or more characteristics of the audio devices indicated in the device group data 228. In some implementations, the device group module 226 may access audio devices to determine the device data 232. In other implementations, the device group module 226 may provide a request to one or more of the audio devices, responsive to which the audio devices may provide the device data 232. In still other implementations, the audio devices may periodically provide device data 232 to the computing device 202. The device data 232 may include one or more of a physical data rate, a packet error rate, or a data throughput value associated with communication between the audio devices and the access point(s) 108. In other implementations, the device data 232 may include other values indicative of communication strength between the audio devices and access point(s) 108, such as RSSI, SNR, or MCS values, retransmission rates, or an indication of the number of data streams able to be transmitted by an audio device.

In some implementations, one or more of the audio devices may determine data throughput values or other values indicative of communication strength, which may be provided to the computing device 202 as device data 232. In other implementations, the audio devices may determine device data 232 such as a physical data rate and packet error rate, and the device metric module 230 may calculate data throughput values for the audio devices using this device data 232, as indicated in Equation 2 above.

The memory 218 may also store a master determination module 234. The master determination module 234 may determine which audio device, indicated in the device group data 228, may be designated as the master audio device 104. The other indicated audio devices may then function as slave audio devices 106. As described with regard to FIG. 1, the master audio device 104 may receive audio data 102 from an external source, such as a content server 112 or external device 114. The master audio device 104 may then distribute the audio data 102 to the slave audio devices 106 via the communication links 110 between the audio devices and the access point(s) 108. The master audio device 104 may be selected by determining the audio device that corresponds to the greatest data throughput value, or other link quality value 116, indicated in the device data 232. In some implementations, the master determination module 234 may exclude one or more of the audio devices from use as the master audio device 104. For example, if the device data 232 associated with an audio device indicates one or more characteristics that may prevent the audio device from receiving audio data 102 from external sources or distributing the audio data 102 to other audio devices, or reduce the quality of such actions, that audio device may be excluded independent of the data throughput value associated therewith.

The memory 218 may additionally store a congestion module 236, which may determine a congestion value associated with use of one or more of the communication links 110. In some implementations, the congestion value may be determined based on access data 238, such as a clear channel access register associated with the audio devices. For example, the access data 238 may indicate a count of unsuccessful attempts to communicate data using one or more communication links 110 as well as a total count of attempts to communicate data using the communication link(s) 110. The ratio of unsuccessful access attempts to total access attempts may indicate a level of congestion associated with use of the communication link(s) 110. For example, a large percentage of unsuccessful access attempts may occur during periods of high use, which may indicate that the network is congested. A smaller percentage of unsuccessful access attempts may occur during periods that the network is not congested.

The memory 218 may also store an airtime module 240, which may calculate an airtime value indicative of the airtime that would be used if the selected audio data 102 were distributed to the selected group of audio devices using the master audio device 104 designated by the master determination module 234. As described previously and illustrated using Equation 3, the airtime value may depend on the number of audio devices indicated by the device group data 228, an audio throughput value associated with the audio data 102, a data throughput value associated with communication between the master audio device 104 and the access point(s) 108, and the data throughput values associated with communication between each of the slave audio devices 106 and the access point(s) 108.

The airtime module 240 may determine correspondence between the determined airtime value and one or more threshold airtime values, which may be stored as threshold data 242. In some implementations, the airtime value or the threshold value may be modified based on the congestion value determined by the congestion module 236. For example, the total airtime used to support a selected group of audio devices during a period of congestion may be represented by the sum of the airtime value and the congestion value. In some implementations the threshold airtime value may be determined based on the maximum airtime capacity of the network, minus a constant or percentage, such as from five to ten percent. Because the quality of an audio output may decrease as utilization of the network airtime approaches one hundred percent, setting the threshold airtime value at an amount less than one hundred percent may prevent this decrease in quality.

If the sum of the airtime value and the congestion value is less than a threshold value, distribution of the audio data 102 using the designated master audio device 104 may be initiated. If the sum of the airtime value and the congestion value is greater than the threshold value, the airtime module 240 may cause a notification to be accessed. For example, the notification may indicate that it is not possible to provide an audio output using the selected group of audio devices. In such cases, the computing device 202 may not initiate distribution of the audio data 102. As another example, the notification may indicate that providing audio output using the selected audio devices may result in irregularities, such as audio stuttering. In such a case, the computing device 202 may initiate distribution of the audio data 102 automatically or responsive to user input confirming the notification. As yet another example, the notification may indicate a relationship between the airtime that would be used by the audio devices and the threshold value. Continuing the example, the notification may indicate a quantity by which the airtime used by the audio devices exceeds the available airtime of the network.

In some implementations, the memory 218 may additionally include a utilization module 244. The utilization module 244 may determine a value indicative of a level of utilization associated with the master audio device 104. For example, the master audio device 104 may include a wireless radio capable of communication using Wi-Fi® and Bluetooth® protocols. If the master audio device 104 receives audio data 102 via a Bluetooth® communication link 110 from an external device 114, this utilization of the wireless radio may limit the resources available for the master audio device 104 to transmit the audio data 102 to slave audio devices 106. As described previously and illustrated using Equation 4, the value indicative of utilization of the master audio device 104 may be based on an airtime value associated with receipt of the audio data 102 from an external source, such as the Bluetooth® airtime used by the wireless radio, the number of audio devices within the group, the audio throughput associated with the audio content 102, the data throughput values and packet error rates associated with the slave audio devices 104, and the congestion value.

The threshold data 242 may also include one or more threshold utilization values. The utilization module 244 may determine correspondence between a determined utilization value and one or more of the threshold utilization values. If the utilization value is less than the threshold utilization value, distribution of the audio data 102 using the designated master audio device 104 may be initiated. If the utilization value is greater than the threshold utilization value, a notification may be generated indicating the relationship between the utilization value and the threshold utilization value. The notification may include, without limitation, the same types of notifications described previously with regard to the airtime value.

Other modules 246 may also be present in the memory 218. For example, encryption modules may be used to encrypt and decrypt communications between computing devices 202. The other modules 246 may also include modules for receiving user input to configure parameters of audio devices, set threshold values of the threshold data 242, and so forth. Other modules 246 may further include location modules that may be used to determine the location of particular audio devices relative to other audio devices or access points 108. In some implementations, the locations of devices may be determined based on device data 232. For example, the device data 232 may include data indicative of the current location of an audio device. In other implementations, the locations of devices may be determined using a radio navigation-based system, such as a Global Positioning System (GPS) receiver, or other terrestrial or satellite-based navigational systems. In still other implementations, the locations of devices may be determined using one or more device sensors or other I/O devices 216. Other modules 246 may additionally include modules used to synchronize and control an audio output, such as by modifying a timing or a volume of particular audio signals.

Other data 248 within the data store 222 may include user input data, such as configurations and settings associated with computing devices 202. Other data 248 may also include security data, such as encryption keys and schema, access credentials, and so forth. Other data 248 may additionally include rules, algorithms, and so forth used to synchronize and control audio output, such as by determining time delays between the emissions of sounds based on the locations of audio devices.

In different implementations, different computing devices 202 may have different capabilities or capacities. For example, servers may have significantly more processor 206 capability and memory 218 capacity compared to the processor 206 capability and memory 218 capacity of audio devices.

Figure 3:
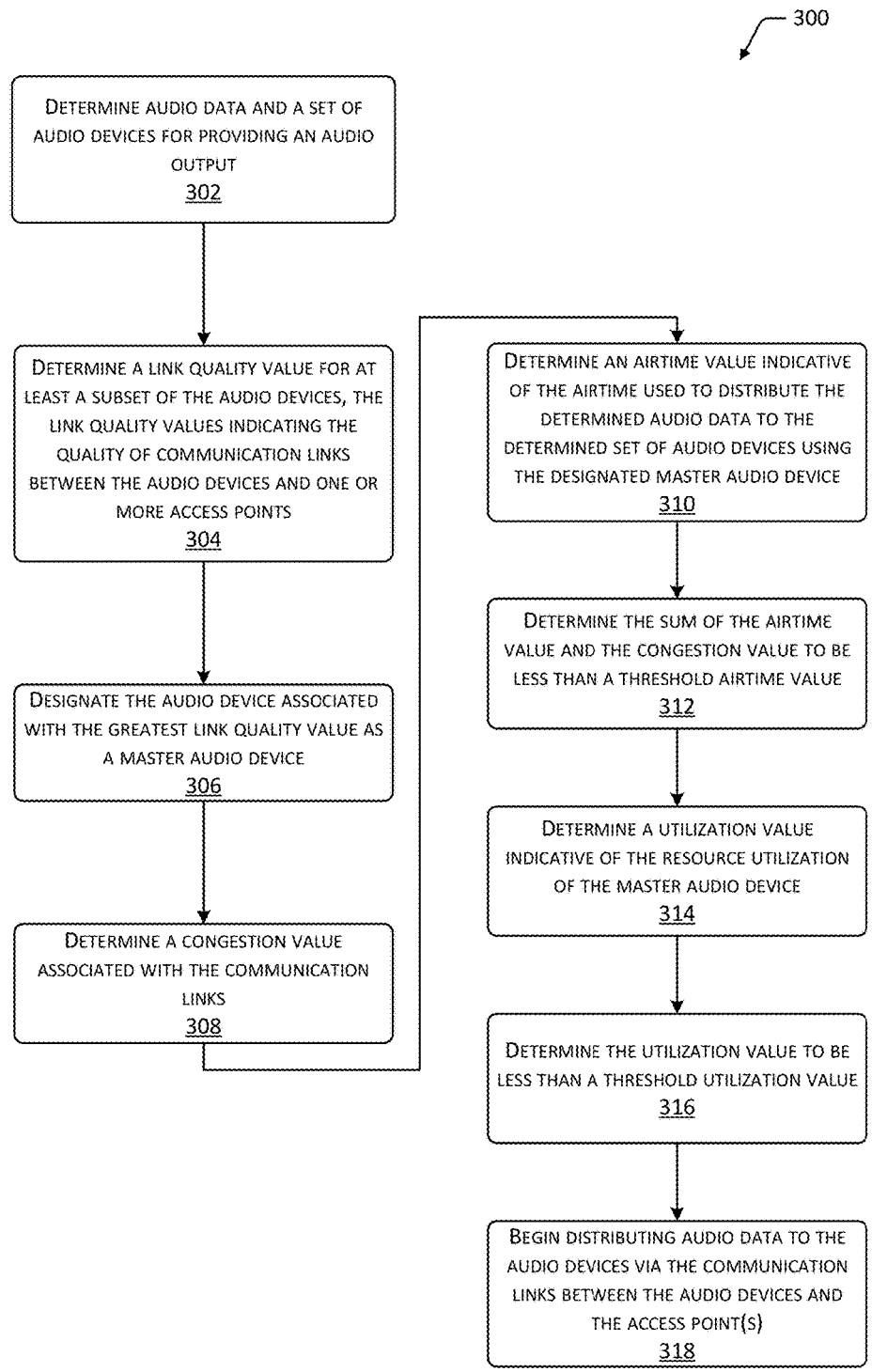
FIG. 3 is a flow diagram illustrating a method for configuring a set of audio devices to provide a distributed audio output.

FIG. 3 is a flow diagram 300 illustrating a method for configuring a set of audio devices to provide a distributed audio output. Block 302 determines audio data 102 and a set of audio devices for providing an audio output. For example, user input may indicate a particular application or other audio data 102 to be used to generate an audio output. In some cases, an audio throughput value associated with the audio data 102 may be determined. User input may also be used to indicate a particular set of audio devices to be used to provide the audio output. In other implementations, one or more applications or audio device may be automatically selected based on preexisting default data or based on values determined from device data 232 associated with the audio devices. For example, audio devices having data throughput values that exceed a threshold value may be used to provide an audio output in the absence of user input.

Block 304 determines a link quality value 116 for at least a subset of the audio devices. The link quality values 116 may indicate the quality of communication links 110 between the audio devices and one or more access points 108. For example, the link quality values 116 may include one or more of data throughput, RSSI, SNR, or MCS values. As another example, the link quality values 116 may include retransmission rates. As yet another example, the link quality values 116 may include a count of data streams that may be simultaneously processed by an audio device. In some implementations, the audio devices, or other computing devices 202 in communication therewith, may be configured to determine an average physical data rate (e.g., using Equation 1, above) and a packet error rate associated with the audio devices. The audio devices or other computing devices 202 may then determine data throughput values for the audio devices based at least in part on the average physical data rate, packet error rate, and a scaling factor, as indicated in Equation 2 above. In some implementations, the scaling factor may be determined using a look-up table or other data structure that associates values for the scaling factor with values for the physical data rate. For example, a table may associate a scaling factor value of 0.7 with a physical data rate ranging from 0 to 10 Mb/s, a scaling factor value of 0.65 with a physical data rate ranging from 10 to 50 Mb/s, and a scaling factor value of 0.6 with a physical data rate ranging from 50 to 100 Mb/s, and so forth. In some implementations, the scaling factor value may range from 0.7 to 0.4, depending on the modulation and technology associated with an audio device, and a table may associate greater scaling factor values with smaller physical data rate values.

Block 306 designates the audio device associated with the greatest link quality value 116 as a master audio device 104. Because each transmission of audio data 102 to a slave audio device 106 may utilize a communication link 110 between the master audio device 104 and the access point(s) 108, use of a master audio device 104 having a large data throughput for communication with the access point(s) 108 may reduce the airtime used by the group of audio devices.

Block 308 determines a congestion value associated with the communication links 110. As described with regard to FIG. 2, in some implementations, the congestion value may be determined based on access data 238, which may include indications of unsuccessful and total attempts to communicate data using a communication link 110. The ratio of unsuccessful access attempts to total access attempts may indicate a current level of use, congestion, or noise associated with one or more of the communication links 110.

Block 310 determines an airtime value indicative of the airtime used to distribute the audio data 102 to the set of audio devices using the designated master audio device 104. As described with regard to FIG. 2, the airtime value may be determined based on the audio throughput of the audio data 102, the data throughput of the master audio device 104, and the data throughput of each slave audio device 106, as indicated in Equation 3. In some implementations, the audio throughput associated with the audio data 102 may include a worst-case estimate (e.g., a maximum value for the audio throughput) to ensure that the airtime used by the audio devices does not exceed the airtime capacity of the network.

Block 312 determines the sum of the airtime value and the congestion value to be less than a threshold airtime value. This determination may indicate that the airtime used by the selected set of audio devices may not exceed the available airtime associated with the network. Therefore, audio data 102 may be distributed to the audio devices without a degradation in quality due to insufficient airtime.

Block 314 determines a utilization value indicative of the resource utilization of the master audio device 104. The resource utilization value may be based on the airtime used by the master audio device 104 to receive the audio data 102 from an external source, such as an external device 114 or content server 112. For example, receipt of the audio data 102 from a computing device 202 via a Bluetooth® connection may utilize resources associated with the wireless radio of the master audio device 104. The number and type of slave audio devices 106 to which the audio data 102 may be distributed may be limited based on the remaining radio resources of the master audio device 104. The utilization value may be based on the airtime used to receive the audio data 102 by the master audio device 104, the number of slave devices 106 to which the audio data 102 is to be distributed, the audio throughput associated with the audio data 102, the data throughput values and packet error rates associated with the slave audio devices 104, and the congestion value, as indicated in Equation 4.

Block 316 determines the utilization value to be less than a threshold utilization value. This determination may indicate that sufficient resources of the master audio device 104 may remain to distribute the audio data 102 to the slave audio devices 106 after receipt of the audio data 102 by the master audio device 104. Therefore, audio data 102 may be distributed to the slave audio devices 106 without a degradation in quality due to insufficient resources of the master audio device 104.

Block 318 begins distributing audio data 102 to the audio devices via the communication links 110 between the audio devices and the access point(s) 108. For example, audio data 102 received by the master audio device 104 may be transmitted to an access point 108 via a first communication link 110(1), then from the access point 108 to a slave audio device 106 via a second communication link 110(2). Each transmission of audio data from the master device 102 may be provided to the access point 108 via the first communication link 110(1), then to a different slave audio device 106 via a communication link 110 between the slave audio device 106 and the access point 108.

In some cases, a second group of audio devices may be determined. For example, a user may select a first group of audio devices located in a first room of a structure to provide a first audio output, then select a second group of audio devices located in a different room of the structure to provide a second audio output. The process indicated in blocks 302 through 318 may be performed in the same manner to determine the master audio device 104 for use with the second group of audio devices, and to determine whether sufficient network airtime remains to provide the second audio output using the second group of audio devices. When block 308 determines the congestion value associated with the communication links 110, use of the communication links 110 by the first group of audio devices may be determined as congestion. Thus, when block 312 determines the sum of the congestion value and the airtime value for the second group of audio devices, this sum may include the airtime used by the first group of audio devices, which is reflected in the congestion value.

Figure 4:
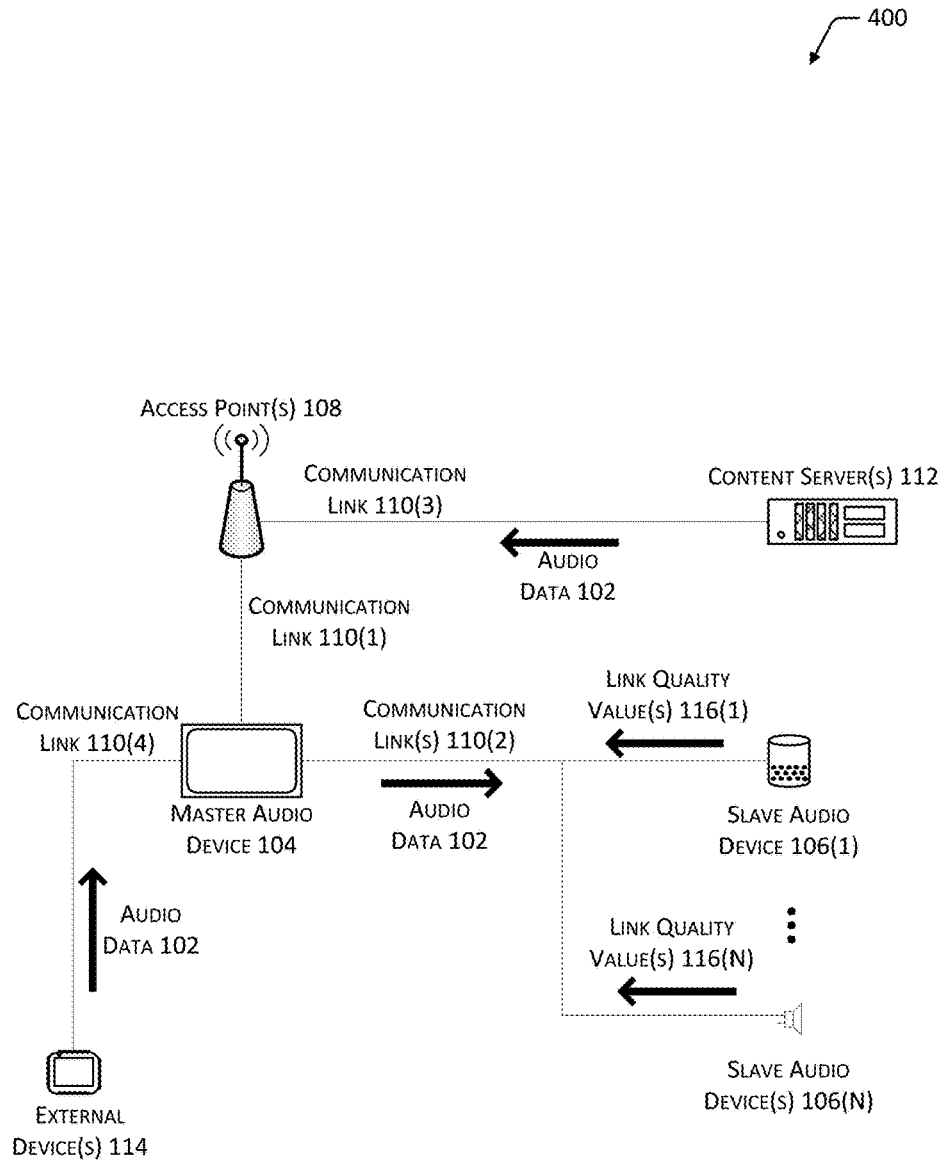
FIG. 4 depicts an implementation of a system for distributing audio data to multiple audio devices using a master audio device.

FIG. 4 depicts an implementation of a system 400 for distributing audio data 102 to multiple audio devices using a master audio device 104. For example, rather than providing audio data 102 from the master audio device 104 to slave audio devices 106 using communication links 110 between the slave audio devices 106 and an access point 108, the master audio device 104 may function as an access point and provide audio data 102 directly to the slave audio devices 106. In one implementation, the master audio device 104 may provide the audio data 102 to multiple slave audio devices 106 in a single transmission, such as a multicast.

The master audio device 104 may communicate with the access point 108 via a communication link 110(1). In some implementations, the master audio device 104 may receive the audio data from one or more content servers 112, which may provide the audio data 102 to the access point 108 via a communication link 110(3). In other implementations, the master audio device 104 may receive audio data 102 from a source that is not associated with the access point 108, such as one or more external devices 114. For example, a tablet computer, smart television, or other computing device 202 in the environment may provide audio data 102 to the master audio device 104 using a Bluetooth® communication link 110(4) or another type of protocol.

The master audio device 104 may provide the audio data 102 to one or more slave audio devices 106 directly, without using communication links 110 between the slave audio devices 106 and the access point(s) 108, such as by generating a multicast transmission. The audio data 102 may be provided from the master audio device 104 to the slave audio devices 106 using one or more communication links 110(2), which may include a multicast transmission or other methods of transmitting data.

The slave audio devices 106 may provide link quality values 116, such as data throughput or RSSI values, as described previously, to the master audio device 104. In some implementations, the link quality values 116 may be used to determine a particular audio device to designate as the master audio device 104. For example, use of an audio device having the greatest data throughput or signal strength for communication with other audio devices as a master audio device 104 may minimize the total airtime used to distribute audio data 102 to the slave audio devices 106. The link quality values 116 may also be used to determine a maximum airtime value associated with the distribution of audio data 102 to the slave audio devices 106 using the master audio device 104.

Figure 5:
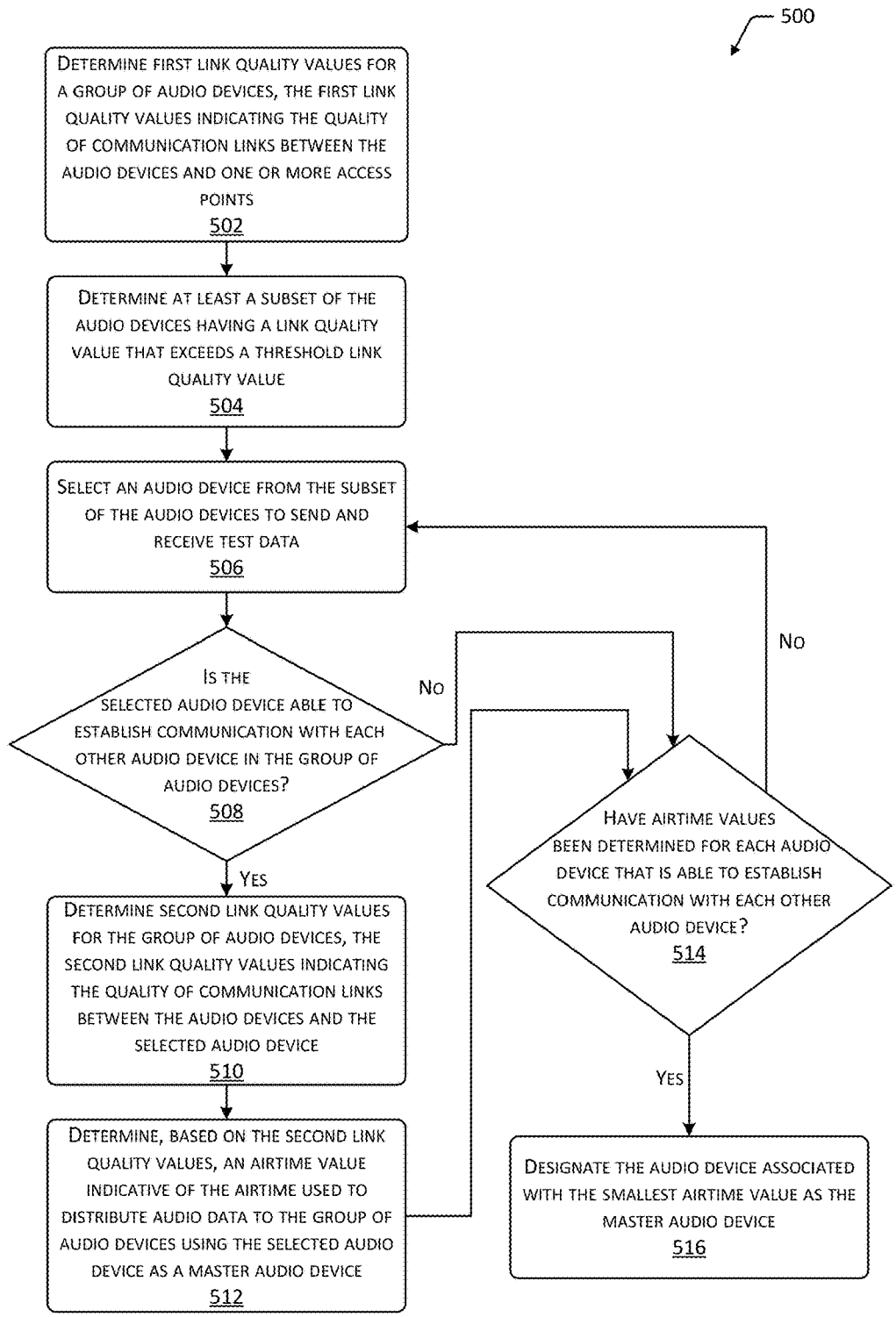
FIG. 5 is a flow diagram illustrating a method for determining a master audio device for use providing a distributed audio output.

FIG. 5 is a flow diagram 500 illustrating a method for determining a master audio device 104 for use providing a distributed audio output. Block 502 determines first link quality values 116 for a group of audio devices. The first link quality values 116 may indicate the quality of communication links 110 between the audio devices and one or more access points 108. For example, user input, default device group data 228, or an automated determination of audio devices based on device data 232 may be used to select a group of audio devices for use distributing audio output. Each of the audio devices may communicate with an access point 108. The audio devices, or another computing device 202 in communication therewith, may be configured to determine one or more of an average physical data rate, a packet error rate, or a data throughput value associated with each audio device. For example, an average physical data rate for an audio device may be determined using Equation 1, described above. A data throughput value (THR) may be determined based on the average physical data rate (AVG-PHY) and a scaling factor (K), as indicated in Equation 8, below:

$$THR=(K*AVGPHY)*AVGPHY \qquad \text{(Equation 8)}$$

In some implementations, the data throughput value may also be determined based on a packet error rate for an audio device, a congestion value associated with use of the audio device, one or more constants, and so forth. As described with regard to FIG. 3, in some implementations, the scaling factor may be determined using a look-up table or other data structure associating scaling factor values with values for the physical data rate. In some implementations, the data throughput value for one or more of the audio devices may also be based in part on the packet error rate for the audio device. For example, Equation 2, above, determines a data throughput value based on the average physical data rate and the packet error rate.

In other implementations, other link quality values 116, such as RSSI, SNR, MCS values, retransmission rates, or numbers of data streams, may be determined in addition to or in place of the data throughput values. For example, in some cases, a RSSI value for an audio device may be determined more quickly than a data throughput value.

Block 504 determines at least a subset of the audio devices having a link quality value 116 that exceeds a threshold link quality value. For example, one or more of the audio devices may have a data throughput value associated with communication with an access point 108 that falls below a threshold value. The limited data throughput of these audio devices may cause the audio devices to utilize additional airtime if designated as a master audio device 104. Therefore, in some implementations, only the subset of audio devices having a link quality value 116 that exceeds the threshold link quality value may be eligible for use as the master audio device 104. Audio devices having a link quality value 116 that is less than the threshold link quality value may be excluded from use as a master audio device 104.

Block 506 selects an audio device from the subset of the audio devices to send and receive test data. In some implementations, each audio device of the subset of audio devices may sequentially be tested by sending test data to, and receiving test data from, each other audio device within the group of audio devices.

Block 508 determines if the selected audio device is able to establish communication with each other audio device in the group of audio devices. For example, an audio device may be located a significant distance from another audio device, or one or more obstacles may be placed between two audio devices, preventing the communication of data between the audio devices. If one of these audio devices were used as a master audio device 104, the other of the audio devices may be unable to receive data from the master audio device 104. Therefore, if an audio device is determined to be unable to establish communication with one or more audio devices in the group of audio devices, that particular audio device may be unsuitable for use as a master audio device 104. In such a case, the method may proceed to block 514. If a selected audio device is determined to be able to communicate with each other audio device within the group, the method may proceed to block 510.

In some implementations, the ability of an audio device to communicate with each other audio device within a group may be determined by providing test data, such as a probe request packet, from the selected audio device to each other audio device. The other audio devices may provide additional test data, such as a probe response packet, to the selected audio device. If test data is not received by either the selected audio device or one of the other audio devices, this may indicate that the location or another characteristic of the selected audio device may inhibit the ability of the selected audio device to function as the master audio device 104. In other implementations, the location of the selected audio device and one or more other audio devices may be determined based on device data 232 or data determined using one or more location sensors. If the selected audio device is not within a threshold distance of each other audio device within the group, the selected audio device may be rendered ineligible for use as the master audio device 104.

Block 510 determines second link quality values 116 for the group of audio devices. The second link quality values 116 may indicate the quality of communication links 110 between the audio devices and the selected audio device. For example, each of the other devices in the group of audio devices may determine an average physical data rate when communicating test data with the selected audio device. A data throughput value associated with communication between the selected audio device and other audio devices may be determined based on the average physical data rate and a scaling factor, as indicated in Equation 8 above. In some implementations, the data throughput value may also be based on the packet error rate associated with communication between the selected audio device and other audio devices, as indicated in Equation 2 above.

Block 512 determines, based on the second link quality values 116, an airtime value indicative of the airtime used to distribute audio data 102 to the group of audio devices using the selected audio device as a master audio device 104. In one implementation, the greatest second link quality value 116 determined for a selected audio device may be determined. The airtime value may be based in part on the greatest second link quality value 116. For example, a first data throughput value may be determined for communication between the selected audio device and a first audio device within the group. A second data throughput value may be determined for communication between the selected audio device and a second audio device within the group. If the first data throughput value is greater than the second data throughput value, and the data throughput values associated with communication between the selected audio device and any other of the audio devices within the group, then the first data throughput value may be determined to be the greatest second link quality value 116 (e.g., THMax in Equation 5). As indicated in Equation 5, above, the airtime value for the selected audio device may be based on the greatest second link quality value 116 and the data throughput value associated with communication between the selected audio device and the access point(s) 108 (TH1 in Equation 5).

Block 514 determines if airtime values have been determined for each audio device in the group of audio devices that is able to establish communication with each other audio device within the group. If each audio device within the group has an associated airtime value, or has been excluded from use as a master audio device 104 in block 504 or block 508, the method may proceed to block 516. If one or more audio devices remain for which no airtime value has been determined, the method may return to block 506, and blocks 508 through 512 may be repeated for a subsequent selected audio device.

Block 516 designates the audio device associated with the smallest airtime value as the master audio device 104. Audio devices that were excluded from use as a potential master audio device 104 in blocks 504 and 508 may not have an associated airtime value and may not be analyzed at block 516. Designation of a master audio device 104 that utilizes the smallest amount of airtime to distribute audio data 102 to slave audio devices 106 may reduce the total amount of airtime used by the group of audio devices when generating the audio output.

Figure 6:
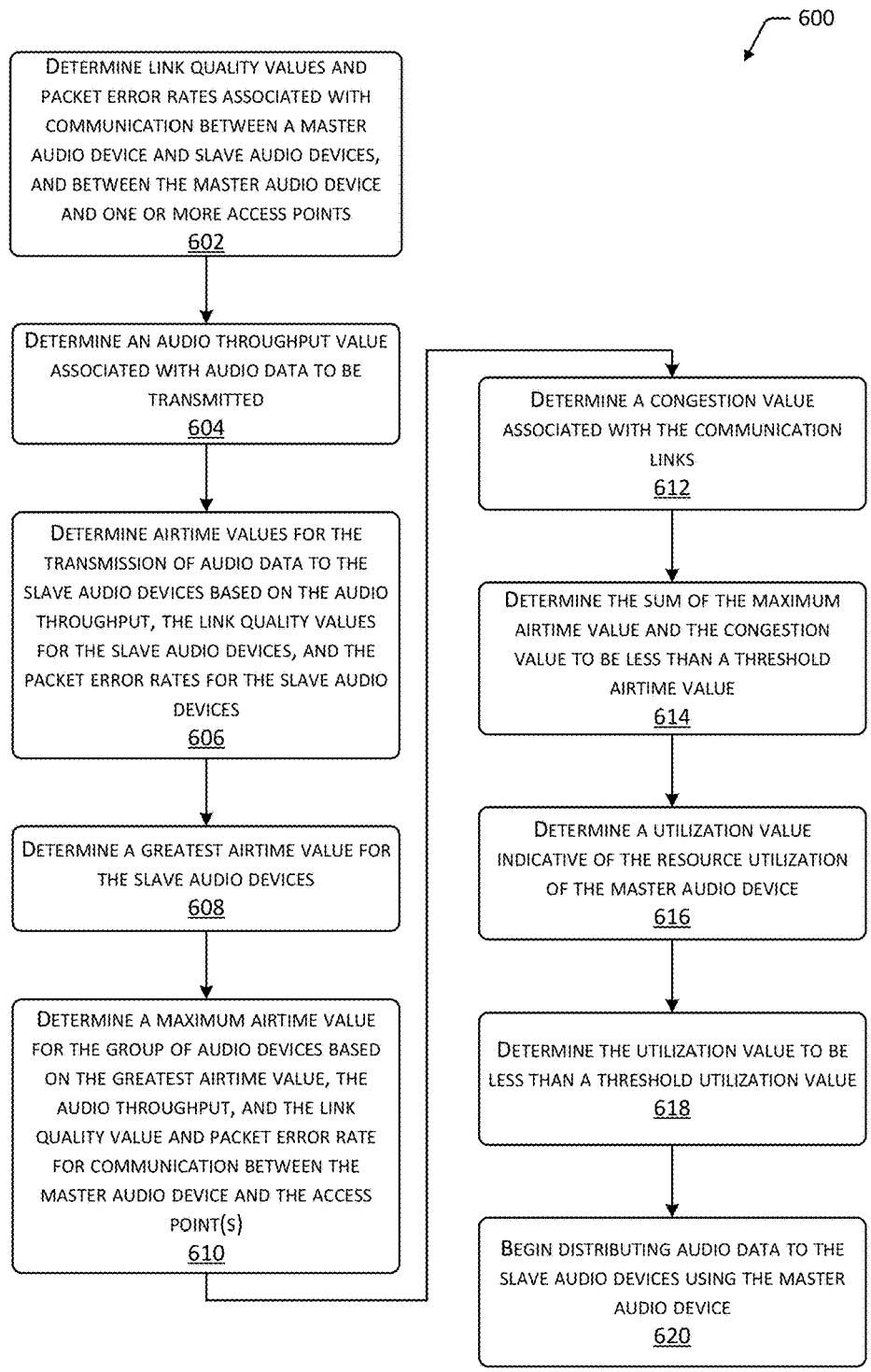
FIG. 6 is a flow diagram illustrating a method for determining whether the airtime used by a selected group of audio devices to distribute audio data exceeds the resources of a network.

FIG. 6 is a flow diagram 600 illustrating a method for determining if the airtime used by a selected group of audio devices to distribute audio data 102 exceeds the resources of a network. The method 600 may be performed subsequent to determining a master audio device 104, such as by performing the method 500 illustrated in FIG. 5. As such, second link quality values 116, such as data throughput values associated with communication between the master audio device 104 and the slave audio devices 106 may have previously been determined in performing the method 500 of FIG. 5. Additionally, a data throughput value associated with communication between the master audio device 104 and one or more access points 108 may also have previously been determined.

Block 602 determines link quality values 116 and packet error rates associated with communication between a master audio device 104 and slave audio devices 106, and between the master audio device 104 and one or more access points 108. As discussed previously, one or more of these values may have been determined as part of a method 500 for designating a master audio device 104. In such a case, block 602 may include accessing previously-determined device data 232. In other implementations, block 602 may include determining one or more link quality values 116 or packet error rates. For example, one or more audio devices may determine an average physical data rate based in part on Equation 1, above, and determine a data throughput value based on the average physical data rate, as indicated in Equation 2, above.

Block 604 determines an audio throughput value associated with audio data 102 to be transmitted. For example, user input may indicate particular audio data 102 or other content, an application for providing audio data 102, and so forth. An audio throughput value may be determined based on the user input. In some implementations, if user input selecting particular audio data 102 or an application is not received, block 604 may determine a maximum audio throughput value as a worst-case estimate. The maximum audio throughput value may correspond to the audio data 102 or application having the greatest audio throughput.

Block 606 determines airtime values for the transmission of audio data 102 to the slave audio devices 106. The airtime values may be based on the audio throughput (THA), the link quality values 116 for the slave audio devices 106, and the packet error rates (PER) for the slave audio devices 106. For example, the link quality values 116 may include data throughput values (THR) associated with communication links 110 between the master audio device 104 and the slave audio devices 106. The airtime value (AT) for a particular slave device 106 may be determined based on Equation 9, below:

$$AT=(THA/THR)*(1+PER) \quad \text{(Equation 9)}$$

In some implementations, the airtime value associated with the slave device 106 may also be based on a congestion value associated with communication using the slave device 106, one or more constants, and so forth. An airtime value may be determined for each slave audio device 106. Then, block 608 may determine a greatest airtime value for the slave audio devices 106. The greatest airtime value may be used to determine a maximum airtime value for the transmission of audio data 102 using the group of audio devices.

Block 610 determines the maximum airtime value for the group of audio devices based on the greatest airtime value, the audio throughput, and the link quality value 116 and packet error rate for communication between the master audio device 104 and the access point(s) 108. For example, the maximum airtime value for the group of audio devices may be determined using Equation 6, above. In Equation 6, the quantity $\max\{(THA/THR)*(1+PER)\}$ may correspond to the maximum airtime value for a particular slave device 106, determined in blocks 606 and 608.

Block 612 determines a congestion value associated with the communication links 110. In some implementations, the congestion value may be determined based on access data 238, which may include indications of unsuccessful and total attempts to communicate data using a communication link 110. The ratio of unsuccessful access attempts to total access attempts may serve as an indicator of a current level of use, congestion, or noise associated with one or more of the communication links 110.

Block 614 determines the sum of the maximum airtime value and the congestion value to be less than a threshold airtime value. This determination may indicate that the maximum airtime value that would be used by the group of audio devices to distribute audio data 102 may not exceed the airtime capacity of the network. Therefore, the audio data 102 may be distributed using the group of audio devices without a degradation in quality cause by insufficient airtime.

Block 616 determines a utilization value indicative of the resource utilization of the master audio device 104. The resource utilization value may be based in part on airtime used by the master audio device 104 to receive the audio data 102 from an external source, such as an external device 114 or content server 112. As described with regard to FIG. 3, the slave audio devices 106 to which the master audio device 104 may distribute data may be limited based on the amount of unused resources of the master audio device 104. In some implementations, the utilization value may be determined as indicated above in Equation 7.

Block 618 determines the utilization value to be less than a threshold utilization value. This determination may indicate that sufficient unused resources of the master audio device 104 remain to distribute the audio data 102 to the slave audio devices 106. Therefore, the audio data 102 may be distributed to the slave audio devices 106 without a degradation in quality due to insufficient resources of the master audio device 104.

Block 620 begins distributing audio data to the slave audio devices 106 using the master audio device 104. For example, as illustrated in FIG. 4, audio data 102 may be received by the master audio device 104 from a content server 112 using a communication link 110(1) with an access point 108. Alternatively or additionally, audio data 102 may be received by the master audio device 104 from one or more external devices 114 via a communication link 110(4), such as a Bluetooth® connection. The master audio device 104 may then transmit the audio data 102 to one or more slave audio devices 106 using one or more communication links 110(2). In some implementations, the communication links 110(2) may include a single transmission, such as a multicast, which may simultaneously provide the audio data 102 to the slave audio devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    a plurality of devices that includes at least a first device and a second device;
    one or more memories storing computer-executable instructions; and
    one or more hardware processors to execute the computer-executable instructions to:
        transmit first test data from the first device to at least a subset of the plurality of devices;
        determine a first set of link quality values indicative of a first quality of communication links between the first device and the at least a subset of the plurality of devices;
        transmit second test data from the second device to the at least a subset of the plurality of devices;
        determine a second set of link quality values indicative of a second quality of communication links between the second device and the at least a subset of the plurality of devices; and
        based on the first set of link quality values and the second set of link quality values, cause the first device to provide data to the at least a subset of the plurality of devices to cause the at least a subset of the plurality of devices to perform an audio-related function associated with the data.

2. The system of claim 1, further comprising computer-executable instructions to:
    determine, based the first set of link quality values, a first airtime value indicative of airtime used to distribute data from the first device to the at least a subset of the plurality of devices;
    determine, based on the second set of link quality values, a second airtime value indicative of airtime used to distribute data from the second device to the at least a subset of the plurality of devices; and
    determine that the first airtime value is less than the second airtime value, wherein the first device is caused to provide the data to the at least a subset of the plurality of devices in response to determining that the first airtime value is less than the second airtime value.

3. The system of claim 1, further comprising computer-executable instructions to:
    determine, based on the first set of link quality values, a maximum airtime value indicative of airtime used to distribute data from the first device to the at least a subset of the plurality of devices; and
    determine that the maximum airtime value is less than a threshold airtime value indicative of a maximum quantity of airtime associated with the plurality of devices, wherein the first device is caused to provide the data to the at least a subset of the plurality of devices in response to determining that the maximum airtime value is less than the threshold airtime value.

4. The system of claim 1, further comprising computer-executable instructions to:
    determine a third link quality value indicative of a third quality of a communication link between the first device and an access point;
    determine a fourth link quality value indicative of a fourth quality of a communication link between the second device and the access point;
    determine that the third link quality value exceeds a threshold link quality value, wherein the first test data is transmitted from the first device in response to the third link quality value exceeding the threshold link quality value; and determine that the fourth link quality value exceeds the threshold link quality value, wherein the second test data is transmitted from the second device in response to the fourth link quality value exceeding the threshold link quality value.

5. The system of claim 1, further comprising computer-executable instructions to:

determine a third link quality value indicative of a third quality of a communication link between the first device and an access point;

determine a fourth link quality value indicative of a fourth quality of a communication link between the second device and the access point; and determine that the third link quality value indicates a greater quality than the fourth link quality value;

wherein transmitting of the first test data by the first device is performed prior to transmitting of the second test data by the second device in response to the third link quality value indicating the greater quality than the fourth link quality value.

6. The system of claim 1, further comprising computer-executable instructions to:

determine that the first device is within a threshold distance of the at least a subset of the plurality of devices, wherein the first test data is transmitted from the first device in response to the first device being within the threshold distance of the at least a subset of the plurality of devices; and determine that the second device is within a threshold distance of the at least a subset of the plurality of devices, wherein the second test data is transmitted from the second device in response to the second device being within the threshold distance of at least a subset of the plurality of devices.

7. The system of claim 1, further comprising computer-executable instructions to:

determine, based at least in part on the first set of link quality values, a utilization value indicative of radio utilization associated with the first device; and determine that the utilization value is less than a threshold utilization value, wherein the first device is caused to provide the data in response to the radio utilization value being less than the threshold utilization value.

8. A system comprising:

a plurality of devices including at least a first device and a second device;

one or more memories storing computer-executable instructions; and one or more hardware processors to execute the computer-executable instructions to:

transmit first test data from the first device to the plurality of devices;

determine, based on transmission of the first test data, a first airtime value indicative of airtime used to distribute data from the first device to the plurality of devices;

transmit second test data from the second device to the plurality of devices;

determine, based on transmission of the second test data, a second airtime value indicative of airtime used to distribute data from the second device to the plurality of devices;

determine that the first airtime value is less than the second airtime value; and in response to the first airtime value being less than the second airtime value, cause the first device to provide data to at least a subset of the plurality of devices to cause the at least a subset of the plurality of devices to perform an audio-related function.

9. The system of claim 8, further comprising computer-executable instructions to:

determine, one or more first link quality values associated with transmission of the first test data from the first device to the plurality of devices;

determine the first airtime value based at least in part on the one or more first link quality values;

determine, one or more second link quality values associated with transmission of the second test data from the second device to the plurality of devices; and determine the second airtime value based at least in part on the one or more second link quality values.

10. The system of claim 8, further comprising computer-executable instructions to:

determine, one or more first link quality values associated with transmission of the first test data from the first device to the plurality of devices;

determine, based at least in part on the one or more first link quality values, a maximum airtime value indicative of airtime used to distribute data from the first device to the plurality of devices; and determine that the maximum airtime value is less than a threshold airtime value indicative of a maximum quantity of airtime associated with the plurality of devices, wherein the first device is caused to provide data to the plurality of devices in response to determining that the maximum airtime value is less than the threshold airtime value.

11. The system of claim 8, further comprising computer-executable instructions to:

determine, a link quality value indicative of a quality of a communication link between the first device and an access point; and determine that the first link quality value exceeds a threshold link quality value, wherein the first test data is transmitted from the first device in response to the first link quality value exceeding the threshold link quality value.

12. The system of claim 8, further comprising computer-executable instructions to:

determine, a first link quality value indicative of a first quality of a communication link between the first device and an access point;

determine, a second link quality value indicative of a second quality of a communication link between the second device and the access point; and based on the first link quality value and the second link quality value, transmit the first test data from the first device prior to transmitting the second test data from the second device.

13. The system of claim 8, further comprising computer-executable instructions to:

determine that the first device is within a threshold distance of the at least a subset of the plurality of devices, wherein the first test data is transmitted from the first device in response to the first device being within the threshold distance of the at least a subset of the plurality of devices.

14. The system of claim 8, further comprising computer-executable instructions to:

determine, one or more link quality values associated with transmission of the first test data from the first device to the plurality of devices;

determine, based at least in part on the one or more link quality values, a utilization value indicative of radio utilization associated with the first device; and determine that the utilization value is less than a threshold utilization value, wherein the first device is caused to provide the data in response to the radio utilization value being less than the threshold utilization value.

15. A system comprising:

a first device;

a second device;

a third device;

one or more memories storing computer-executable instructions; and one or more hardware processors to execute the computer-executable instructions to:

determine a first airtime value indicative of airtime used to distribute data from the first device to the second device and the third device;

determine a second airtime value indicative of airtime used to distribute data from the second device to the first device and the third device;

determine that the first airtime value is less than the second airtime value; and in response to the first airtime value being less than the second airtime value, cause the first device to provide data to the second device and the third device to cause the second device and the third device to perform an audio-related function.

16. The system of claim 15, further comprising computer-executable instructions to:

determine a first link quality value associated with transmission of data from the first device to the second device; and determine a second link quality value associated with transmission of data from the first device to the third device;

wherein the first airtime value is determined based at least in part on one or more of the first link quality value or the second link quality value.

17. The system of claim 15, further comprising computer-executable instructions to:

determine a first link quality value associated with transmission of data from the first device to the second device;

determine a second link quality value associated with transmission of data from the first device to the third device;

determine, based on one or more of the first link quality value or the second link quality value, a maximum airtime value indicative of airtime used to distribute data from the first device to the second device and the third device; and determine that the maximum airtime value is less than a threshold airtime value indicative, wherein the first device is caused to provide the data to the second device and the third device in response to determining that the maximum airtime value is less than the threshold airtime value.

18. The system of claim 15, further comprising computer-executable instructions to:

determine a first link quality value indicative of a first quality of a communication link between the first device and an access point;

determine a second link quality value indicative of a second quality of a communication link between the second device and the access point;

determine that the first link quality value is greater than the second link quality value; and in response to determining that the first link quality value is greater than the second link quality value, determine the first airtime value prior to determining the second airtime value.

19. The system of claim 15, further comprising computer-executable instructions to:

determine that the first device is within a threshold distance of one or more of the second device or the third device, wherein the first airtime value is determined in response to the first device being within the threshold distance of the one or more of the second device or the third device.

20. The system of claim 15, further comprising computer-executable instructions to:

determine, one or more of a first link quality value associated with transmission of data from the first device to the second device or a second link quality value associated with transmission of data from the first device to the third device;

determine, based at least in part on the one or more of the first link quality value or the second link quality value, a utilization value indicative of radio utilization associated with the first device; and determine that the utilization value is less than a threshold utilization value, wherein the first device is caused to provide the data in response to the radio utilization value being less than the threshold utilization value.

* * * * *